F. G. BROWN.

Improvement in Fences.

No. 127,558. Patented June 4, 1872.

UNITED STATES PATENT OFFICE.

FLOYD G. BROWN, OF CHAPEL HILL, TEXAS.

IMPROVEMENT IN FENCES.

Specification forming part of Letters Patent No. 127,558, dated June 4, 1872.

Specification describing an Iron Fence-Paneling, invented by FLOYD G. BROWN, of Chapel Hill, in the county of Washington and State of Texas.

The invention consists in manufacturing a fence or fence-paneling of hoop-iron, so that it may be sold in sections of any desired length, rolled up in a compact form, easily and cheaply transported to any distance, and put up by the farmer with rapidity and facility.

Figure 1:
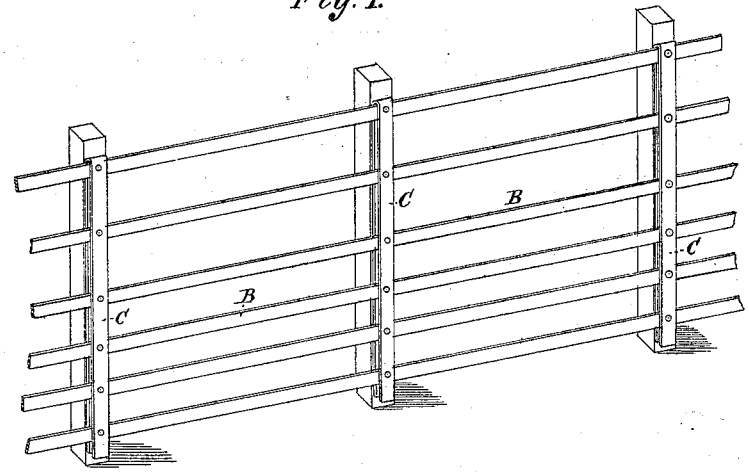
Figure 2:
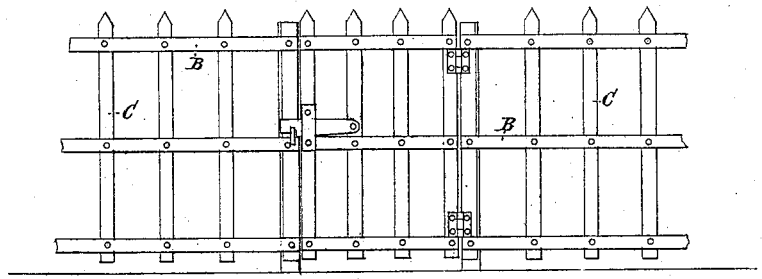
Figure 3:
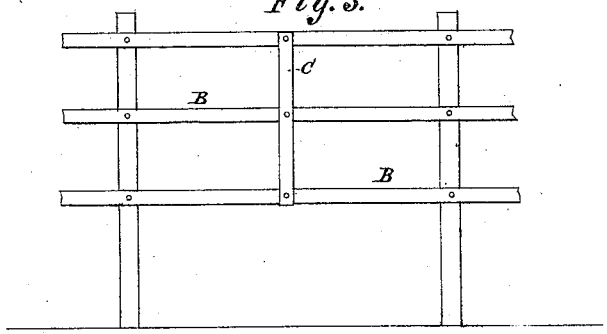

In the accompanying drawing, Figure 1 represents a perspective view of my invention in the form of a rail-fence; Fig. 2 is a front elevation of the same in the form of a paling-fence; and Fig. 3 is a similar view of same in the form of a stock rail-fence.

In each of the figures, B represents long strips or longitudinal rails made of any desired width, and held at the proper distance apart by vertical strips C riveted thereto. The particular form of fence is immaterial, as it may be composed of rails placed close together, as shown in Fig. 1, where the object is to fence against hogs and small animals; or it may be made, as shown in Fig. 2, with fewer rails, and these placed at greater intervals, where it is designed only to exclude or inclose large cattle or horses; or, again, it may be made in the form of a paling-fence, as shown in Fig. 3 of drawing.

The great advantages of this paneling are that, by manufacturing it in large quantities, it can be supplied to the public at moderate prices, and a farmer can order and receive at once sufficient material to inclose his whole farm and make all his cross-lines in a single season and between the times of cropping. All that he is required to do is to prepare rough posts of any kind, that will require neither boring nor mortising, and very little hewing. In many parts of our country rail-timber is practically unattainable, while in a still larger region labor is exceedingly scarce and only obtainable at high rates. In all such sections of country my invention will enable the farmer to inclose his farm and fields at a moderate price and in a brief time.

Having thus described my invention, what I claim as new, and desire to secure by Letters Patent, is—

As an article of manufacture, a fence-paneling made of hoop-iron, as set forth.

FLOYD G. BROWN.

Witnesses:
SOLON C. KEMON,
THOS. D. D. OURAND.